US009317511B2

(12) United States Patent
Kanfi (10) Patent No.: US 9,317,511 B2
(45) Date of Patent: Apr. 19, 2016

(54) SYSTEM AND METHOD FOR MANAGING FILESYSTEM OBJECTS

(75) Inventor: Arnon Kanfi, Tel Aviv, IL (US)

(73) Assignee: INFINIDAT LTD., Herzliya (IL)

( * ) Notice: Subject to any disclaimer, the term of this patent is extended or adjusted under 35 U.S.C. 154(b) by 147 days.

(21) Appl. No.: 13/526,572

(22) Filed: Jun. 19, 2012

(65) Prior Publication Data

US 2013/0339406 A1 Dec. 19, 2013

(51) Int. Cl.
*G06F 17/30* (2006.01)

(52) U.S. Cl.
CPC .... *G06F 17/30082* (2013.01); *G06F 17/30221* (2013.01); *G06F 17/30607* (2013.01)

(58) Field of Classification Search
CPC ............. G06F 17/3012; G06F 17/30082
USPC .............. 707/822, 825, 828, 829, 830, 999.2
See application file for complete search history.

(56) References Cited

U.S. PATENT DOCUMENTS

| | | | |
|---|---|---|---|
| 4,945,475 A | 7/1990 | Bruffey | |
| 5,930,805 A * | 7/1999 | Marquis | 707/797 |
| 6,775,679 B2 * | 8/2004 | Gupta | |
| 7,363,352 B2 * | 4/2008 | Nakatani et al. | 709/217 |
| 7,383,286 B2 * | 6/2008 | Hamanaka et al. | 707/694 |
| 7,778,984 B2 * | 8/2010 | Zhang et al. | 707/696 |
| 7,783,615 B1 * | 8/2010 | Compton et al. | 707/694 |
| 7,984,088 B2 * | 7/2011 | DeLorme et al. | 707/828 |
| 8,041,735 B1 * | 10/2011 | Lacapra et al. | 707/783 |
| 8,086,553 B2 * | 12/2011 | Bone et al. | 706/47 |
| 8,135,763 B1 * | 3/2012 | Compton et al. | 707/822 |
| 8,161,005 B1 * | 4/2012 | Ozekinci et al. | 707/640 |
| 8,166,074 B2 * | 4/2012 | Pettovello | 707/797 |
| 8,225,371 B2 * | 7/2012 | Jones et al. | 726/1 |
| 8,296,682 B2 * | 10/2012 | Sloo | 715/853 |
| 8,402,071 B2 * | 3/2013 | Skillcorn | 707/822 |
| 8,478,799 B2 * | 7/2013 | Beaverson et al. | 707/823 |
| 8,484,259 B1 * | 7/2013 | Makkar et al. | 707/827 |
| 8,489,638 B2 * | 7/2013 | Kuszmaul et al. | 707/790 |

(Continued)

FOREIGN PATENT DOCUMENTS

WO 2012114338 8/2012

OTHER PUBLICATIONS

Koplovitz, Haim, unpublished U.S. Appl. No. 12/901,723, titled "System and Method for Sorage Optimization," filed Oct. 11, 2010 with a Non-publication Request.

(Continued)

*Primary Examiner* — Miranda Le
(74) *Attorney, Agent, or Firm* — Reches Patents (57) ABSTRACT

A system and method of operating a filesystem for managing filesystem objects is disclosed. The filesystem objects are characterized by metadata parameters included in a global directory object arranged in a plurality of global directory object (GDO) pages. Responsive to receiving a request for creating a new filesystem object, a parent key is obtained. The parent key is indicative of an identifier of a direct parent directory requested for hosting the new filesystem object. A target page that corresponds to the parent key is located within the plurality of GDO pages. The target page further includes a direct parent directory metadata record associated with the direct parent key and includes metadata parameters related to the direct parent directory. An object key is created as corresponding to the same target page, thereby enabling accommodation of an object metadata record, related to the new filesystem object, on the target page.

14 Claims, 8 Drawing Sheets

(56) References Cited

U.S. PATENT DOCUMENTS

| | | | |
|---|---|---|---|
| 2004/0193632 A1* | 9/2004 | McCool et al. | 707/101 |
| 2005/0102297 A1* | 5/2005 | Lloyd et al. | 707/100 |
| 2006/0106841 A1* | 5/2006 | Bybee et al. | 707/101 |
| 2007/0094313 A1* | 4/2007 | Bolotin | 707/205 |
| 2007/0174309 A1* | 7/2007 | Pettovello | 707/100 |
| 2008/0294703 A1* | 11/2008 | Craft et al. | 707/204 |
| 2009/0193206 A1 | 7/2009 | Ishii et al. | |
| 2009/0228535 A1* | 9/2009 | Rathi et al. | 707/204 |
| 2009/0300770 A1* | 12/2009 | Rowney et al. | 726/26 |
| 2010/0205156 A1* | 8/2010 | Anderson et al. | 707/690 |
| 2010/0235396 A1* | 9/2010 | Chaurasia et al. | 707/784 |
| 2010/0262638 A1* | 10/2010 | Fitzgerald | 707/822 |
| 2010/0287345 A1 | 11/2010 | Cherian et al. | |
| 2012/0166401 A1* | 6/2012 | Li et al. | 707/692 |
| 2012/0226712 A1* | 9/2012 | Vermeulen et al. | 707/770 |
| 2012/0304247 A1* | 11/2012 | Badger et al. | 726/1 |
| 2013/0013643 A1* | 1/2013 | Kaplan et al. | 707/792 |

OTHER PUBLICATIONS

Koplovitz, Haim, unpublished U.S. Appl. No. 61/445,078, titled "Cloud Storage Arrangement and Method of Operating Thereof," filed Feb. 22, 2011.

* cited by examiner

Converting a base part of a filename into a long number, wherein the beginning of the string is the MSB (most significant bits) of the number and the end of the string is the LSB (least significant bits) of the number
710

Dividing the long number by a large prime number and obtaining the remainder
720

Applying a hash function on an extension part of the filename and appending a hash result of the hash function to the remainder
730

SYSTEM AND METHOD FOR MANAGING FILESYSTEM OBJECTS

FIELD OF THE PRESENTLY DISCLOSED SUBJECT MATTER

The presently disclosed subject matter relates to the field of files management and more particularly, to managing metadata of objects in a filesystem.

BACKGROUND OF THE INVENTION

A filesystem is a means for organizing data that is stored in a storage device, as a collection of files and directories. In order to present the data as a collection of files and directories, the filesystem maintains structures of metadata. The term metadata, in the context of a filesystem, refers to information that describes volumes, files and directories, but this information is not part of the stored data itself. For example, the following information items describe a file and are considered as part of the file's metadata: a file name, file size, creation time, last access/write time, user id, and block pointers that point to the actual data of the file on a storage device. Information items that compose metadata of a directory mainly include names and references to files and sub-directories included in the directory.

Traditional filesystems utilize two principal data structures for managing metadata. One data structure is for maintaining file metadata (also known as 'inode' in Unix-style file systems) while the second data structure is a directory, which is used for storing and maintaining directory content.

The inode is a data structure that stores all the information about a regular file, directory, or other file system object. The inode is typically part of an inode table and is identified by an inode number, which is an index of an entry containing the inode, in the inode table.

Most filesystems uses an inode table, which is either contiguous or scattered among different allocation groups (sub-volumes), for improving performance. Other methods of storing and managing inodes that use B-trees and methods of prepending the inodes to the file data, have been occasionally used as well. Some filesystems (such as NTFS and VXFS—Veritas File system) use internal files to store the inodes.

Traditional Unix and Linux filesystems, such as NFS (Network File System), use inodes and directories that are managed as separate entities. Windows' NTFS (New Technology File System) uses a table named MFT (Master File Table). MFT entries are equivalent to Unix inodes. Most filesystems do not store file's metadata in directory entries and force the filesystem to obtain that information from the inodes.

Directories are implemented as files that contain tuples of file-names and inode-numbers. Some filesystems (e.g. Ext2-Ext4) include additional information in the directory entry like a file type. Most filesystems store each directory in a separate block, preferably closed to the data of the directory. Traversing a whole directory tree (which is executed for backups, copying, virus scans, etc.) is a time consuming operation, because the directories are scattered all over the volume.

Generally, a directory contains 10-20 files and sub-directories, so that the block allocated to the directory is mostly empty. On the other hand, a large directory may be spanned over multiple blocks that are not necessarily contiguous, hence scanning and lookups are much slower in large directories due to non-sequential reading of the non-contiguous blocks.

The Btrfs filesystem (B-TRee File System, a GPL-licensed file system for Linux) uses B-trees to manage the filesystem. Btrfs stores inodes together with the file data and may store small files directly in the B-tree. Directory indexes are kept in a global B-tree but the directory data (the tuples: file-name & inode-number) is actually stored in individual directory objects.

Hierarchical File System (HFS) is a file system developed by Apple Inc. HFS manages a data structure called Catalog File, which is a B-tree that contains records for all the files and directories stored in a volume. There are four types of records in the catalog file: a File Thread Record, a File Record, Directory Thread Record and a Directory entry. Files and directories in the Catalog File are located by a unique Catalog Node ID (CNID). A File/Directory Thread Record stores just the name of the file/directory and the CNID of its parent directory. A File Record stores metadata about the file including its CNID, the size of the file, timestamps, block extents of the data, etc.

The filesystem is associated with a volume that has been initialized for hosting the filesystem. The volume is a collection of blocks on one or more storage devices (e.g. disks). The volume may be all of the blocks on a single storage device, the blocks of a partition, which is a portion of the storage device, or it may even span over multiple storage devices. The files' metadata is generally stored in a dedicated area of the same volume that stores files and directories of the filesystem or otherwise may be stored as a special file within the volume.

A B-tree or a B+tree, which is a type of tree that is commonly used by filesystems for various purposes, represents sorted data in a way that allows for efficient insertion, retrieval and removal of records, wherein each record is identified by a key. An internal node (non-leaf node) includes multiple keys and a leaf node includes data. The number of keys in a node can be minimum n and maximum 2n. If a node has 2n keys, then adding a key to that node can be accomplished by splitting the 2n key node into two n key nodes and adding the new key to the parent node. Each split node has the required minimum number of keys=n. If an internal node and its neighbor (an adjacent node at the same level) each has n keys, and a key is deleted from the internal node, then the internal node is combined with its neighbor.

A file handle is a reference that the filesystem assigns to a file when it is opened. The filesystem uses the file handle for locating the metadata of the file, when accessing the file and the handle is used throughout the session of accessing the file. File handles are typically implemented as a tuple that is composed of three components: (i) File system ID (FSID); (ii) inode number; and (iii) Generation number. The FSID is used to select the filesystem, which identifies a partition or volume. The generation number is used to invalidate the handle, in case the inode gets deleted and recycled. Reassigning the deleted inode to another file includes changing the generation number, while the old file is still open and the host may try to access the file with the number of the reassigned inode but with the old file generation.

An Access Control List (ACL) is a filesystem object that defines file access rights and contains entries that specify individual user or group rights to specific files. An ACL specifies which users are granted access to a file, as well as what operations are allowed. Each entry in a typical ACL specifies a user(s) and an operation that the user is permitted to perform on the file. There are several approaches for storing an ACL: they can be stored in the inode of the file, in a separate block pointed by the inode, in a separate inode, or one file to store all the ACLs, as in Microsoft.

SUMMARY

According to the presently disclosed subject matter there is provided a method of operating a filesystem for managing filesystem objects located in a non-transitory storage media and arranged in a hierarchical directory structure, the filesystem objects characterized by metadata parameters included in a global directory object arranged in a plurality of global directory object (GDO) pages, the method includes: responsive to receiving a request for creating a new filesystem object, obtaining a parent key indicative of an identifier of a direct parent directory requested for hosting the new filesystem object; locating within the plurality of GDO pages a target page corresponding to the direct parent key. the target page further includes a direct parent directory metadata record associated with the direct parent key and including metadata parameters related to the direct parent directory; and creating an object key indicative of the new filesystem object, wherein said object key is created as corresponding to the same target page, thereby enabling accommodation of an object metadata record on said target page, said object metadata record associated with the object key and configured to comprise metadata parameters related to the new filesystem object.

According to certain embodiments, the method further includes generating a metadata record that includes metadata parameters related to the new filesystem object; associating the metadata record with the object key indicative of the new filesystem object, and storing the metadata record on the target page corresponding to the object key.

The new filesystem object may be a file, a directory, an access control lists (ACL) and the like.

According to certain embodiments, the parent key is included in the request for creating a new filesystem object.

According to other aspects, the parent key is further indicative of a non-direct parent directory and the method further includes: locating within the plurality of GDO pages a page corresponding to the parent key indicative of a non-direct parent directory; obtaining a respective directory identifier and a filename from a non-direct parent metadata record included on the page and associated with the parent key indicative of a non-direct parent directory; composing a new parent key based on the directory identifier and the filename and repeating the above operations until composing the direct parent key.

According to certain embodiments, the method further includes creating an object directory identifier in a case when the new filesystem object is a sub-directory, such that the object directory identifier is lexicographically subsequent to a respective direct parent directory identifier.

The object directory identifier may include the direct parent directory identifier as the most significant part, appended by a uniquifier index.

According to certain aspects of the presently disclosed subject matter, the object directory identifier is selected from a predefined pool of consecutive identifiers, the predefined pool associated with the target page.

According to certain embodiments of the presently disclosed subject matter, the method further includes creating a filename value based on an object name included in the request for creating a new filesystem object.

The filename value is preferably created such that multiple filename values are consecutive if the corresponding object names are consecutive.

According to certain embodiments, the object key includes the identifier of a direct parent directory, as the most significant part of the object key and the respective filename value as the least significant part of the object key.

The method may further include creating a file handle configured to accommodate the object key to be generated in association with the request for creating a new filesystem object.

According to the presently disclosed subject matter there is provided a method of operating a filesystem for managing filesystem objects located in a non-transitory storage media and arranged in an hierarchical directory structure, the filesystem objects are characterized by metadata parameters comprised in a global directory object (GDO) including a plurality of global directory object pages, the method includes: responsive to receiving a request for scanning a directory, obtaining a first key indicative of the directory to be scanned, wherein the first key includes a first directory identifier as the most significant part; locating within the plurality of GDO pages a target page corresponding to the first key and including a directory metadata record corresponding to the first key and indicative of a directory identifier of the directory to be scanned; retrieving from the target page one or more metadata records including metadata parameters related to respective filesystem objects hosted in the directory to be scanned, wherein each metadata record is associated with an object key indicative of respective filesystem object, and wherein said object key includes the directory identifier as the most significant part. The GDO pages are sorted according to object keys and the directory identifier is lexicographically subsequent to the first directory identifier.

According to certain embodiments, in case the filesystem object is a directory, obtaining from a metadata record related to the filesystem object a second directory identifier, and recursively repeating the step of retrieving using the second directory identifier as the directory identifier, wherein the second directory identifier is lexicographically subsequent to the directory identifier.

According to certain embodiments, the method further includes: concurrently with the step of retrieving, prefetching at least one adjacent page, wherein the at least one adjacent page is a GDO page having object keys that are subsequent higher than the object keys in the target page and wherein metadata records, related to additional filesystem objects hosted in the directory to be scanned or in sub-directories within the directory to be scanned, are hosted in the at least one adjacent page; and retrieving from the at least one adjacent page additional metadata records that includes metadata parameters related to the respective additional filesystem objects.

According to the presently disclosed subject matter there is provided a system for managing filesystem objects arranged in a hierarchical directory structure, the filesystem objects characterized by metadata parameters included in a global directory object (GDO) that includes a plurality of global directory object pages, the system includes a processor, a first non-transitory storage media in communication with the processor and accommodating the global directory object, and a second non-transitory storage media memory in communication with the processor, the second non-transitory storage media storing machine instructions that cause the processor to perform the method steps described above.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "obtaining", "locating", "creating", "generating", "storing", "composing", or the like, refer to the action and/or processes of a computer that manipulate and/or transform data into other data, said data represented as physical quantities, e.g. such as electronic quantities, and/or said data representing the physical objects. The terms "computer" and "processor" as used herein should be expansively construed to cover any kind of electronic device with data processing capabilities.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

The system and method described herein utilize a single global object that includes metadata of all the objects of one filesystem, both the directories and file metadata (inode information).

The single global object, hereinafter, referred to as a GDO (Global Directory Object), assists in any file or directory operation that requires either: lookup for an existing file or directory, new file or sub-directory cataloging within its parent directory, directory scanning, directory tree traversing, reading and writing file's data and metadata and any other operation that requires accessing metadata.

The GDO is composed of multiple GDO pages, wherein each GDO page includes multiple directory entries. Each directory entry includes: a key and a metadata record that contains the entire metadata of one object, associated with the key. One directory possesses one or more directory entries that belong to child objects (files and sub-directories) of the directory. One or more directories, including all their directory entries, may reside in a single GDO page.

The key identifies an object (a file or a sub-directory) within the filesystem and is used to search the object within the GDO. The key includes: (i) a parent directory identifier that uniquely identifies an upper level directory, and (ii) an object-name manipulation. The object-name manipulation can be a variation or derivation of the object name or a formula applied on the object name. The object-name manipulation, hereinafter, will be referred to as a filename value. It is noted that the filename value is applicable to files, directories or any other filesystem objects, other than files. The aim of the file-name value is to represent the file name, which can be quite long, as a compact number.

One metadata record includes metadata parameters of one file (or sub-directory). Each metadata parameter can be one of the following types but not limited to: (i) a file name (or directory name—for directory, or any other object name); (ii) file attributes, that include for example: file size, creation time, last access/write time, user id, number of hard links and flags (e.g. windows flag), such as: read only, hidden file, system file, a compressed file indication, etc. Some of these attributes may be applicable to directories; (iii) ACL (access control list) or a reference to an ACL; (iv) data block pointers that points to the actual data on the volume; (v) Immediate data (embedded data)—for small sized files, all the actual data is included in the metadata record. The content of symbolic links is also stored in the metadata record; and (vi) any other type of file/directory metadata.

The GDO may be implemented by using a B-Tree or B+Tree or any other type of data structure that represents sorted data in a way that allows efficient search, insertion, retrieval and removal of records. Leaf nodes of the tree are the GDO pages described above, while internal nodes (nodes at the upper levels of the tree) are pages that store only the keys and in addition: pointers to lower level nodes and pointers to adjacent nodes at the same level. Each GDO page may have, for example, a size of 64 KB, which enables storing around 100-200 directory entries, though any other page sizes are applicable as well.

Figure 1:
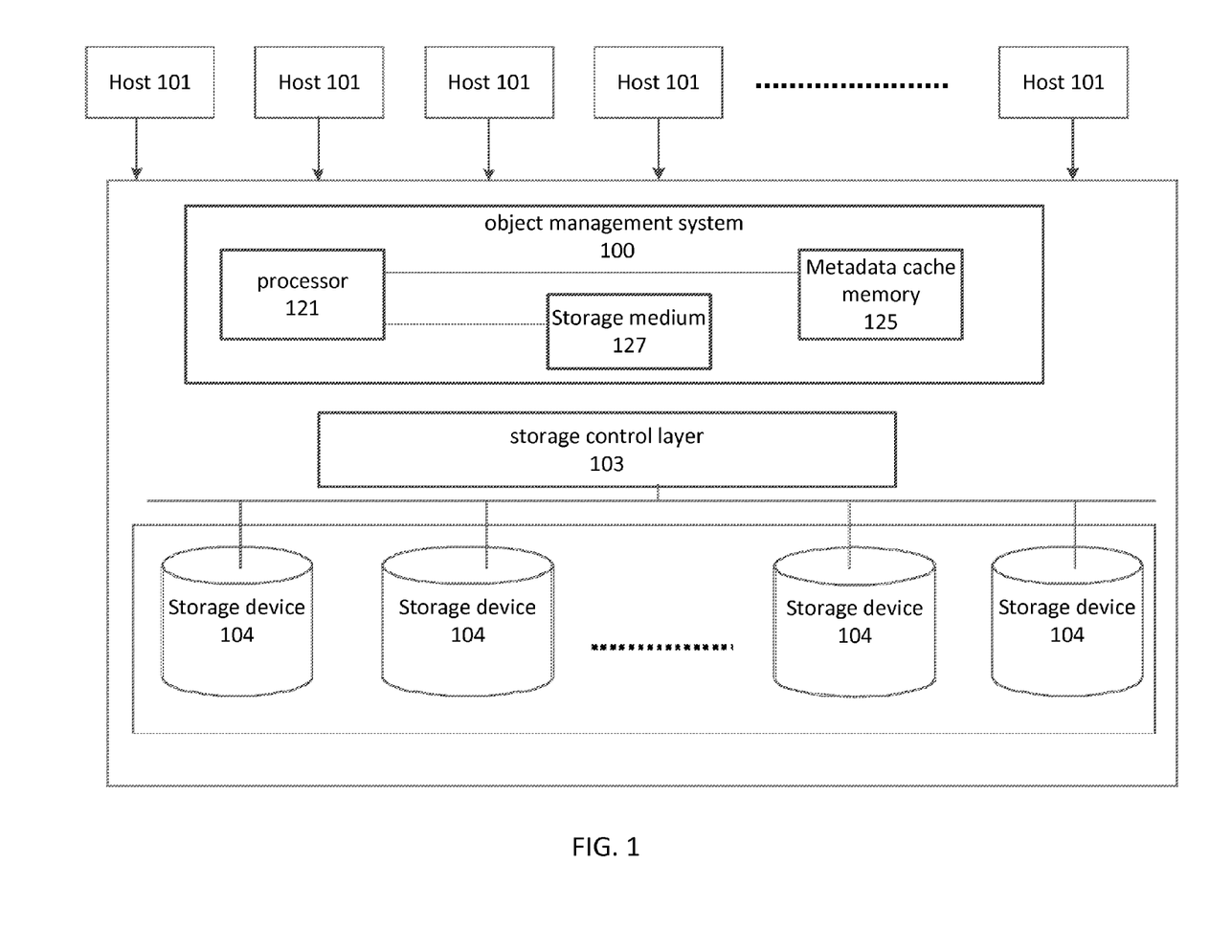
FIG. 1 illustrates a schematic block diagram of an object management system, in accordance with embodiments of the presently disclosed subject matter.

FIG. 1 illustrates a schematic block diagram of a system 100, for managing filesystem objects of one or more filesystems and especially managing the metadata (GDO) of filesystem objects, according to embodiments of the presently disclosed subject matter. Each GDO is associated with one filesystem.

Object management system 100 is operatively coupled to at least one storage device 104 that stores the data and metadata of objects included in filesystems that are managed by object management system 100. Object management system 100 is also coupled, either directly or through a network, to hosts 101 and receives filesystem commands from hosts 101.

Object management system 100 may implement a server side of a filesystem and enables external applications or hosts 101, to access objects, e.g. files, that are stored in storage devices 104. Hosts 101 interface object management system 100, using a client side filesystem application.

Object management system 100 can include or be otherwise associated with at least one processing unit, such as processor 121, configured for: (i) receiving, from hosts 101, filesystem commands that involve accessing metadata of objects and transmitting back responses to hosts 101; (ii) creating, maintaining and looking up the GDO for metadata of objects involved in the filesystem commands, as will be further detailed with reference to FIGS. 6-8.

Optionally, object management system 100 may be coupled to storage devices 104 via a storage control layer 103, which in turn is coupled to storage devices 104 constituting a physical storage space. According to another embodiment, storage control layer 103 may be included in object management system 100.

Storage control layer 103 can be operable to handle a virtual representation of the physical storage space and to facilitate mapping between the physical storage space and its virtual representation. In such cases, storage control layer 103 can be configured to create and manage at least one virtualization layer interfacing between object management system 100 (or other external applications and hosts) and the physical storage space. The virtualization functions may be provided in hardware, software, firmware or any suitable combination thereof.

The physical storage space may comprise any appropriate permanent storage medium and may include, by way of non-limiting example, one or more disk units (DUs), also called "disk enclosures", including several disk drives (disks). Storage control layer 103 and storage devices 104 may communicate in accordance with any appropriate storage protocol.

The physical storage space further includes a plurality of physical data blocks, each physical data block may be characterized by a pair ($DD_{id}$, DBA) where $DD_{id}$ is a serial number associated with the disk drive accommodating the physical data block, and DBA is a block number within the respective disk.

The entire address space of the storage system is divided into logical volumes, and each logical volume becomes an addressable device. A logical volume (LV) or logical unit (LU) represents a plurality of data blocks characterized by successive Logical Block Addresses (LBA). Different logical volumes may comprise different numbers of data blocks, which are typically of equal size within a given system (e.g. 512 bytes).

Each logical volume is used by object management system 100 for hosting one filesystem. The logical volume may be a portion of the physical storage space, i.e. a collection of physical data blocks from multiple storage devices, or alternatively, the logical volume may include the physical data blocks of one storage device or part of the physical data blocks of one storage device.

The logical volume stores all the filesystem objects' data. The GDO that includes metadata of the filesystem objects is stored in a dedicated area of the volume or is otherwise stored as a special file in the volume.

Object management system 100 may further include a metadata cache memory 125 for caching all or part of the GDO pages. Portions of the GDT are preferably read from the volume into metadata cache memory 125 in a granularity of pages. Writing portions of the GDT may be done in a granularity that is smaller than one page and may be as small as one physical block.

Object management system 100 further includes a storage media memory 127, coupled to processor 121. Storage media memory 127 stores machine instructions for performing the methods detailed in FIGS. 6-8.

Figure 2:
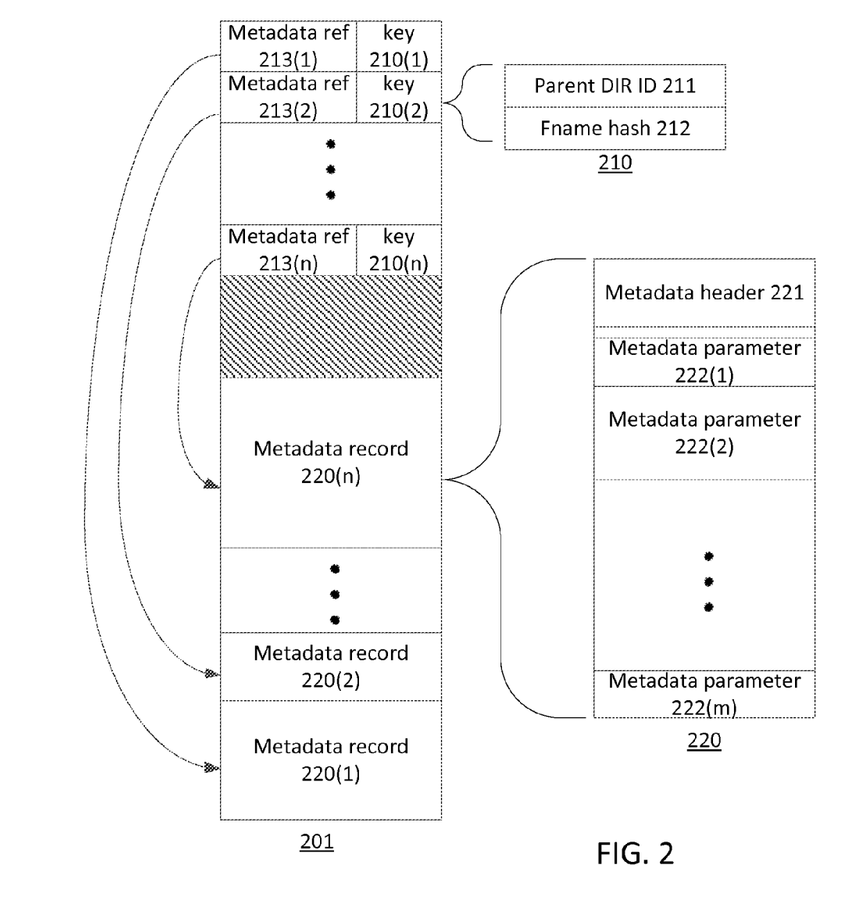
FIG. 2 is a schematic diagram illustrating an implementation example of a page in a global directory object, in accordance with an embodiment of the presently disclosed subject matter.

FIG. 1, described above, illustrates a general schematic of the system architecture in accordance with an embodiment of the presently disclosed subject matter. Certain embodiments of the present invention are applicable to the architecture of a computer system described with reference to FIG. 1. However, the invention is not bound by the specific architecture; equivalent and/or modified functionality may be consolidated or divided in another manner. Those versed in the art will readily appreciate that the invention is, likewise, applicable to any computer system and any filesystem architecture. In different embodiments of the invention the functional blocks and/or parts thereof may be placed in a single or in multiple geographical locations (including duplication for high-availability). Operative connections between the blocks and/or within the blocks may be implemented directly (e.g. via a bus) or indirectly, including remote connection. Connections between different components in illustrated in FIG. 1, may be provided via Wire-line, Wireless, cable, Internet, Intranet, power, satellite or other networks and/or using any appropriate communication standard, system and/or protocol and variants or evolutions thereof (as, by way of unlimited example, Ethernet, iSCSI, Fiber Channel, etc.). FIG. 2 illustrates a schematic implementation example of a GDO page 201 in accordance with certain embodiments of the presently disclosed subject matter. GDO page 201 includes keys 210-1-210-n and respective metadata records 220-1-220-n of various sizes. n—is the number of metadata records stored in GDO page 201 and its maximum value may vary from one GDO page to another, since metadata records 220 are of variable sizes, as demonstrated in FIG. 2. Keys 210 are used for searching the GDO and for ordering metadata records 220 in a sorted manner. Each key 210 is associated with one metadata record 220. Metadata records 220, are stored as a stack (i.e. added to the other end of the page, with regard to the side of the keys, and towards the keys side), for facilitating adding of new entries and for achieving a flexible utilization of the page, whose space is split between the first part of the keys and the second part of metadata records. Other page structures for holding keys and metadata records may be implemented as well, or the keys may reside in another page and point to a page that holds only metadata records.

Each metadata record 220 is composed of multiple metadata parameters 222-1-222-m. m—is the number of metadata parameters in metadata record 220 and may vary among metadata records 220. Metadata parameters 222 are of variable sizes.

Optionally, metadata record 220 includes a metadata header 221. Metadata header 221 may include: the number of metadata parameters included in metadata record 220 and the total length of all the metadata parameters (or total length of the whole metadata record). Metadata header 221 may further include an inode number and a generation number to be provided in a file handle of filesystems that make use of file handles, e.g. NFS (Network File System).

Optionally, GDO page 201 includes a page header (not shown in FIG. 2) for storing data that is required for managing the page, such as free space management of the page.

Each key 210 includes: a directory identification (ID) 211 of a parent directory of the corresponding object—as the most significant part of key 210 and a filename value 212—as the least significant part of key 210. Directory ID 211 uniquely identifies a directory, while filename value 212 represents a filename associated with the key but is preferably shorter than the filename. Each key 210 is accompanied by a metadata reference 213, which points to metadata record 220 that corresponds to key 210. Metadata reference 213 may be an offset, with respect to the page start or page end or an absolute address pointer.

FIGS. 3a, 3b, 4a-4c describe mechanisms for assigning a directory ID to a newly created directory. The value of directory ID 211, which composes the most significant part of the key, determines which GDO page hosts the metadata of the object(s) associated with the directory ID 211, or vice versa—selecting a GDO page that will host a directory determines its directory ID 211.

Grouping parent directories and their descendent objects within the same page or within a small set of pages speeds up tree traversal operations by reducing the number of I/O operations that are required to obtain the metadata. Furthermore, if metadata of a file is located within the same page as the page of the metadata of its parent directory, certain operations applied on the file and involve accessing the metadata of its parent directory, also are improved, as only one I/O operation is performed, for accessing the shared page of both, instead of two I/O operations for accessing the two metadata records.

Grouping close related objects in one page or within a small set of pages also increases the chances for cache hits (i.e. the page is found in the cache memory and need not be read from a disk), for many filesystem operations that access related objects, such as: directory scanning, directory tree traversing, sequential directory/file reading, etc. These operations will benefit cache hits, since these operations involve accessing objects that are hierarchically closed, so they are grouped in one (or a few) GDO page(s). For example, if an operation involves accessing objects A, B and C that are hierarchically related (for example: B is an object in directory A and C is an object in directory A or B), after accessing object A, its page is read and cached in memory 125. When B and C are accessed, their page is already in cache memory 125, since it is most probably, the same page of A.

In accordance with certain aspects of the presently disclosed subject matter there is allocated, for a new object, an entry in a GDO page, based on the location of its parent directory.

By way of non-limiting example, the following embodiments can be implemented for allocating a metadata record, for a directory or file, in close proximity to a metadata record of its parent directory. Both embodiments assign directory IDs that influence the location of the associated directories in the GDO.

According to one embodiment, directory IDs 211 are chosen, so as to reflect the directory hierarchy in a directory tree, such that a directory ID of a sub-directory will be lexicographically subsequent to a parent directory.

A root directory has, for example, a directory ID of "0". The children (sub-directories) of the root have incremental directory-IDs for each immediate sub-directory, for example: 01-00-00-00, 02-00-00-00, 03-00-00-00, etc. The grandchildren of the root inherit their parent's ID in the most significant part of their directory-ID, in addition to their own incremental ID, for example: the children of directory ID 01-00-00-00 have the following IDs: 01-01-00-00, 01-02-00-00, 01-03-00-00, etc. This example allows having up to four directory levels with up to 255 children per level, but other hierarchical IDs with fewer or more than four levels may be implemented, as well as reserving more or less than one byte (255 values) per hierarchy. Since the keys in a GDO page are sorted, the directory ID, according to the suggested scheme, reduces jumps to different pages when visiting sub-directories, as the sub-directories will be grouped in the page of their parent directory. Furthermore, since directory ID 211 is the most significant part of key 210 and since the B-tree is an ordered tree, traversing the whole B-tree will retrieve all the directories along with their sub-directories (in a Depth-first traversal order). Note that instead of appending an incremental index to the parent directory ID, any other uniquifier index may be appended. Given that the prefix of the directory ID is common to all sibling sub-directories of the same parent directory, a uniquifier index is an identifier that makes the directory-ID unique, among directory IDs of all sibling sub-directories.

Figure 3A:
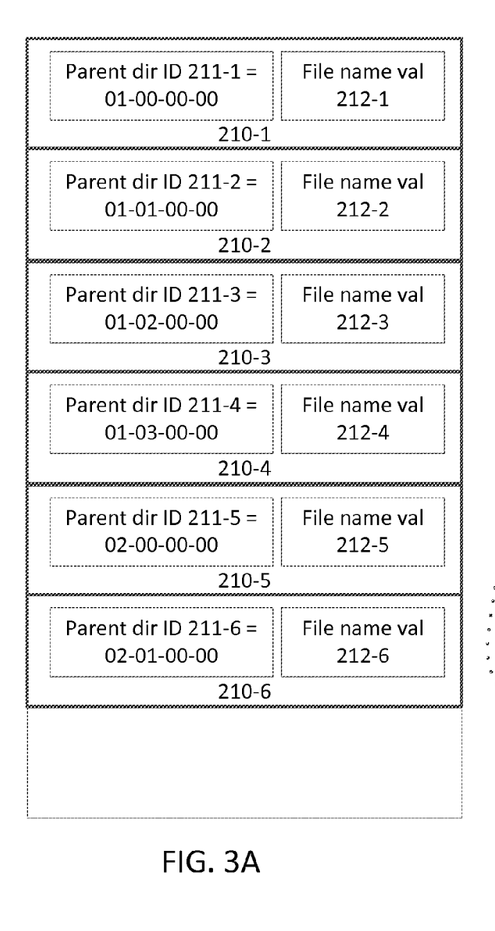
FIGS. 3A-3B illustrate an implementation example of directory identifiers assignment, in accordance with an embodiment of the presently disclosed subject matter.
Figure 3B:
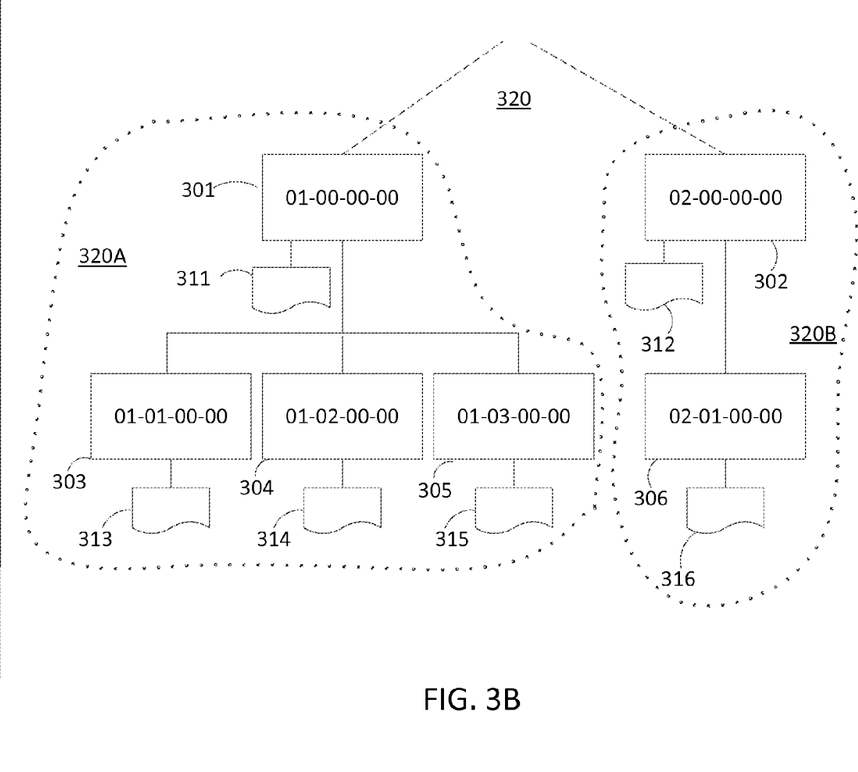

FIG. 3A illustrates keys 210(1)-210(6) that correspond to files 311-316 that are part of a directory tree 320 illustrated in FIG. 3B. Keys 210(1)-210(6) respectively include directory IDs 211(1)-211(6) and filename values 212(1)-212(6). Files 311-316 reside under directories 301-306, respectively. For the sake of simplicity, only one file per directory is illustrated. File 311 resides under directory 301, whose directory ID is 01-00-00-00. Therefore, the parent's directory ID 211(1) of file 311 includes the directory ID=01-00-00-00 of its parent directory, i.e. of directory 301. The least significant part of key 210(1) is filename value 212-1. Another example: File 316 resides under directory 306, whose directory ID is 02-01-00-00. Therefore, key 210(6) of file 316 includes the directory ID=02-01-00-00 of its parent directory, i.e. of directory 306. Although not illustrated, a similar pattern is applied to keys of the directories, for example: directory 304 has a key (not illustrated) whose most significant part includes its parent directory ID=01-00-00-00 and the least significant part is the filename value that is derived from the name of directory 304. As demonstrated in FIG. 3A, metadata records 210 of the children (files) of sub-tree 320A (FIG. 3B) are grouped together due to the lexicographical characteristics of their keys. Metadata records and keys 210 of the children (files) of sub-tree 320B are also grouped together and are in close proximity to metadata records and keys 210 of their sibling sub-tree 320A.

According to the second embodiment for implementing allocation of metadata entries in close proximity to entries of their parent directories, a central pool of directory IDs is utilized for allocating directory IDs. However, if all directory IDs 211 were allocated from a single pool when the file/directory is created, then small sibling directories would be spread all over the GDO pages. The proposed solution is designed to minimize the distribution of directories of the same branch, over GDO pages and to increase their locality in the GDO.

Each filesystem has a common pool that is used to allocate Directory IDs. Directory IDs will be allocated, per GDO page, from the common pool, in groups of N directory IDs at a time, where N is also referred to as an allocation group size. The common pool handles a parameter: next-directory-ID (to be allocated) that is incremented by N (=allocation group size) whenever a group of directory IDs is allocated from the common pool. The directory-IDs that are allocated upon each allocation, range between next-directory-ID and next-directory-ID+N.

Each GDO page manages a local pool. Directory IDs of directories that are assigned to the page, are allocated from the local pool of the page. The allocation starts from the first directory ID number that was allocated to the page, and the directory ID is incremented for each new directory that is assigned to the page, until all the directory IDs in the local pool are assigned. When the entire directory IDs are assigned, a new group of directory IDs is allocated to the GDO page.

During a page split the remaining of the page's local pool will be split, half of the pool is assigned to the new page, unless the local pool is too small; in the latter case the new page obtains a new group from the central pool.

When a new object is created, the page of the parent directory is located and the new object is added as an entry in the parent's page. For an object that is a directory, a directory ID is allocated from the local pool of the parent's page. The key of the new object includes the directory-ID of its parent directory. In this way, sub-directories and files reside in the same page as the parent directory, as long as the page is not split. When a page is split, some of the sub-directories may be moved to the new page, but still some level of grouping is maintained, as only two pages are allocated to the parent directory and its sub-directories. Since a relatively small amount of pages hold a sub-directory-tree, there is an elevated chance that these pages will be found in the cache memory when scanning or traversing the sub tree.

Figure 4A:
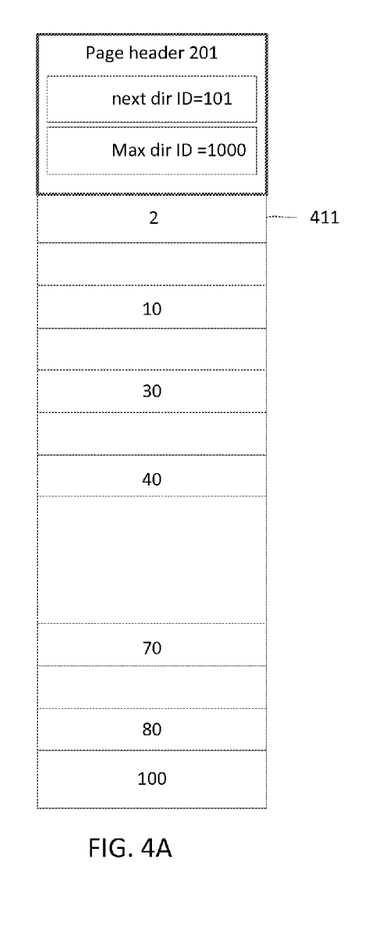
FIGS. 4A-4C illustrate an implementation example of directory identifiers assignment, in accordance with another embodiment of the presently disclosed subject matter.

FIG. 4A illustrates an example of a page 201 that was originally assigned with a group of directory IDs, from the common pool, in a range 1-1000 (N=1000). Page 201 can hold up to e.g. one hundred directory entries and is currently full (i.e. the next entry addition will cause a page split). The current local pool of page 201 indicates that the next directory ID to be allocated is 201, since the directory IDs 1-100 were already allocated. Part or all of the records in page 201 store metadata of the objects included in a sub-tree 433 of FIG. 4C. Note that sub-tree 433 is a directory tree and is not the B–tree of the GDO.

Figure 4B:
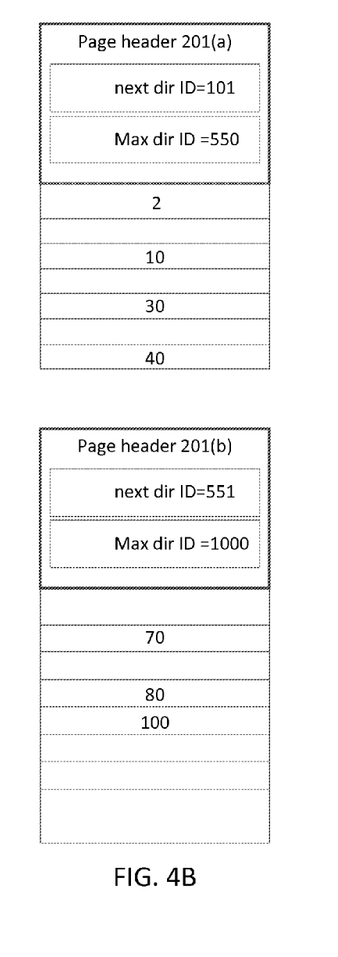
Figure 4C:
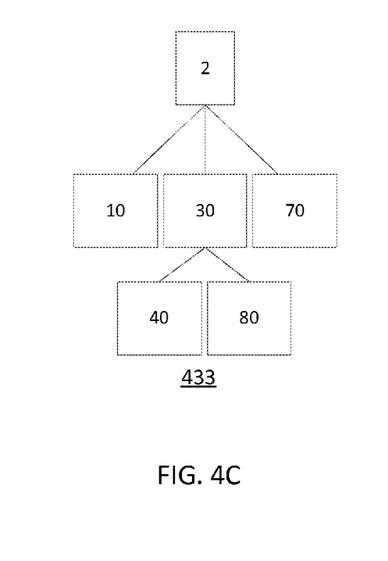

The root of sub-tree 433 is a directory that is assigned with a directory-ID=2 and is stored in a directory entry 411 of page 201. When a sub-directory of directory-ID=2 is created, the parent directory ID (=2) is provided in the creation request, page 201 that stores the parent directory (directory-ID=2) is located and a new directory ID (10) is assigned, from the local pool of page 101, to the new sub-directory. The ID=10 is the 'next directory ID' at the time of directory creation. A second sub-directory is assigned with a directory-ID=30 and the third directory is assigned with a directory-ID=70. When sub-directories of directory-ID=10 are created, again page 201 is located as the page of the parent directory (having an ID=10) and the directory-IDs=40, 80 are assigned, respectively. Note that the directory, having directory-ID=70, was created after the directory identified as directory-ID=40, that is located in a lower level of sub-tree 433.

Page 201 may include a sub-tree that is broader than sub-tree 433, i.e. sibling directories of directory-ID=2 may be included in page 201, as well as its parent directory. In any case, page 201 includes directories that are close in reference to their location in the directory tree.

Suppose page 201 is now full and includes one hundred entries. Adding another entry will cause a split of page 201. FIG. 4B illustrates two pages 201(*a*) and 201(*b*) after the split. Each of the pages initially includes 50 entries (half of the original page 201) and each of the pages inherited half of the remaining of the local pool of page 201. The range of the directory-IDs in the local pool, prior to the split, was 101-1000. After the split, page 201(*a*) inherited a local pool ranging from 101 to 550 and page 201(*b*) inherited a local pool ranging from 551 to 1000.

The least significant part of key 210 reflects the file name. Since the file name itself can be quite long, it is not suitable for being part of a key, whose length is limited. Furthermore, the key also serves as a file handle (or part thereof) and a file handle is limited to 64 bytes (in NFS-v3, earlier versions used 32 bytes and other filesystems use even less bytes). Thus, instead of using the whole file name in the key, filename value 212 that represents the file name is used instead.

Filename value 212 should reflect some of the characteristics of a file name as detailed below.

Files that would appear adjacent to each other, when sorted lexicographically, according to file names, are assigned with filename values 212 that also possess lexicographical affinity, so that they have high probability of appearing in one GDO page. This is relevant to directories with a large number of files whose metadata records would not fit in one page (even though these files share the same parent's directory ID). This is important for cases of sequential file reading, in a lexicographical order. For example: applications that load files in batches, e.g. for uploading photos from a camera, where images have successive names like img00000001.jpg, img00000002.jpg, img00000003.jpg, etc. The images of such a batch were probably uploaded as part of a specific event (e.g. a trip to Italy), so the chances are that a user would like to view these images one after the other. Thus, filename values 212 should preserve the lexicographical order of the file names, for example: if filename value 212(1) represents the file name 'img00000001.jpg', and filename values 212(2) represents the file name 'img00000002.jpg', then filename value 212(1) and filename value 212(2) should also be successive values.

Most hashing functions will randomly distribute the hash values of such names resulting in consecutive images that are stored in different leaf pages when large directories are used.

One technique for preserving the names order, in most cases, is modulo function. The string of the file name is first converted to a long number, wherein the beginning of the string is the MSB (most significant bits) of the number and the end of the string is the LSB (least significant bits) of the number. The file name is probably too large to be represented even as a 64 bit number so the string is copied to an array of unsigned 64 bit numbers that represents a very large number.

The large number is then divided by a large prime number that returns a remainder. If the length of filename value 212 is chosen to be 64 bits, then the large prime number may be chosen as the largest unsigned 64 bit prime number (18446744073709551557).

It is also desirable that the hash function will generate case insensitive hash values, so files that differ only by case will be stored in the B+tree next to each other. This is useful for filesystems that need to be accessed from case preserve clients like Windows machines. In order to achieve the above requirement, case sensitivity can be eliminated by using an upper case or lower case conversion of the file name prior to applying the hash formula. In this case, the file name 'img0001' and the file 'IMG0001' will have the same filename value and will reside one after the other (or at least in close proximity).

Files with the same base name (i.e. the name not including the extension part) and different extensions have some chance of being accessed one after the other, for example: index file file1.idx and data file file1.dat of a database table may be accessed together; a video file movie1.avi is probably accessed together with a subtitle movie1.srt. Thus, it is highly desirable that files with the same base name and different extensions reside together, so there is a need to eliminate the effect of the extension on the most significant part of the filename value. Before applying the hash function on the file name, the extension is separated from the file name. The hash function that generates the most significant part of the filename value is applied only on the base name, not including the extension. A separate hash function is applied on the extension and the result is appended, as a least significant part, to the filename value. The most common extension format contains a dot followed by 1-4 alphanumeric ASCII characters. The following description is for handling extension with the common format, but other extension formats can be handled using similar or other formulas. According to one embodiment, the extension is converted to a number using e.g. base 36 encoding (base 36 includes 10 digits—0-9; and 26 letters a-z) in the range 0-1679615 (4 digits on a 36 base forms the largest number: $36^4-1=1679615$). The result is ~21 bits long but can be reduced to 16 bits by dividing it by 65521 (the largest 16 bit prime) and using the remainder.

Both hashes values, the value of the base name and the value of the extension, are combined to form filename value, so that the base name hash value is the most significant part of the filename value and the extension hash value is the least significant part, so that it has a minimal contribution to the keys ordering. One way to combine the two parts is given by the following formula: base-name-hash*65521+extension-hash. The separation of the extension from the rest of the name assists in grouping all files with the same name but different extensions together, regardless of the extension length (1-4).

Figure 5:
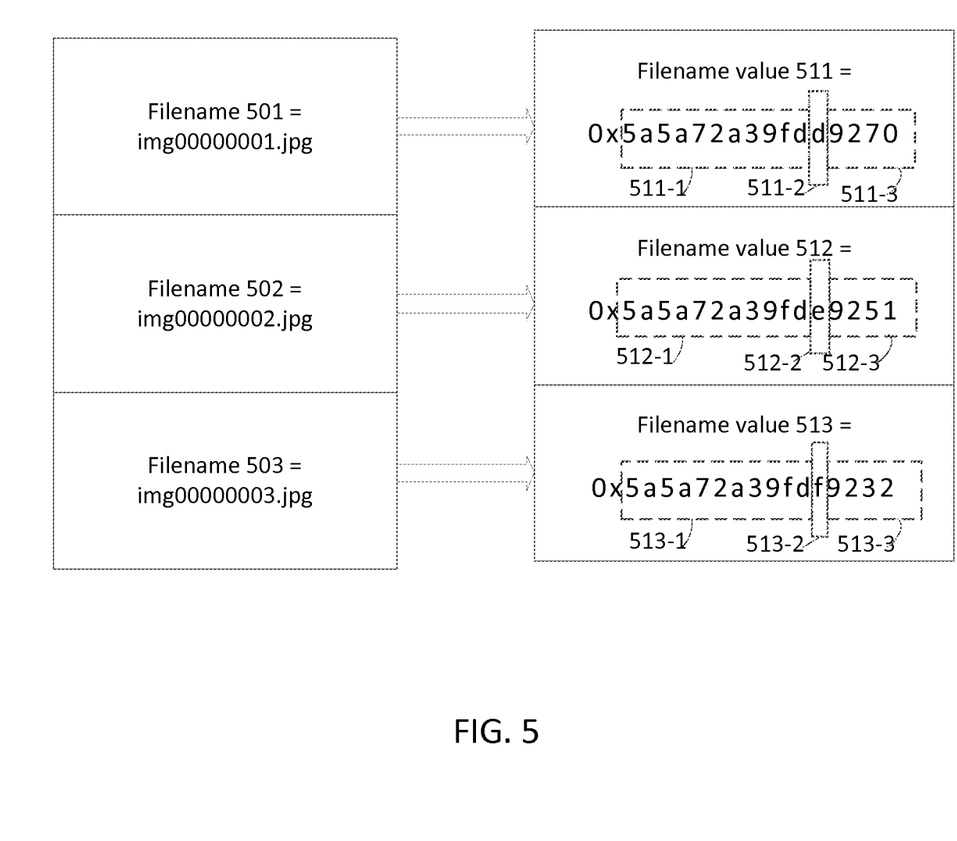
FIG. 5 illustrates an implementation example of filename value assignment, in accordance with an embodiment of the presently disclosed subject matter.

FIG. 5 illustrates an example of filename values 511, 512 and 513 generated for corresponding file names 501, 502 and 503, using the formula described above. File names 501, 502 and 503 are lexicographical consecutive names (img00000001.jpg, img00000002.jpg and img00000003.jpg), wherein the last characters of the base names are consecutive numbers (or characters). The resulting filename values 511-513 have the following characteristics: first parts 511-1, 512-1, 513-1 of the respective filename values 511-513 are identical among the three results and correspond to the identical part of the names (img0000000). Second parts 511-2, 512-2, 513-2 of the three filename values are consecutive characters (d, e and f) that correspond to the consecutive characters (1, 2 and 3) at the end of the base names. Third parts 511-3, 512-3, 513-3 are the results of the extension hashes after being combined with the file-name-hash (multiplied by 65521).

ACLs (Access Control Lists) are cataloged in the GDT in a similar manner as files. When a new ACL is created and assigned to a file, the ACL is treated as if it were a separate file, i.e. its content is stored as a data of a regular file and a metadata record is assigned to the ACL. The metadata record of the associated file will refer to the metadata record of the ACL. A filename value of the ACL is calculated based on the ACL content rather than a filename. The directory ID of the ACL is an arbitrary directory ID and may be assigned using a dedicated directory ID range reserved for special files. Before storing the ACL content, the filename value is calculated based on the content and searched for existence in the GDO. If an ACL with identical content exists, it will be found by searching the filename value in the GDO and the file's metadata record will refer to the already existing ACL. Thus, one ACL may serve multiple files.

Figure 6:
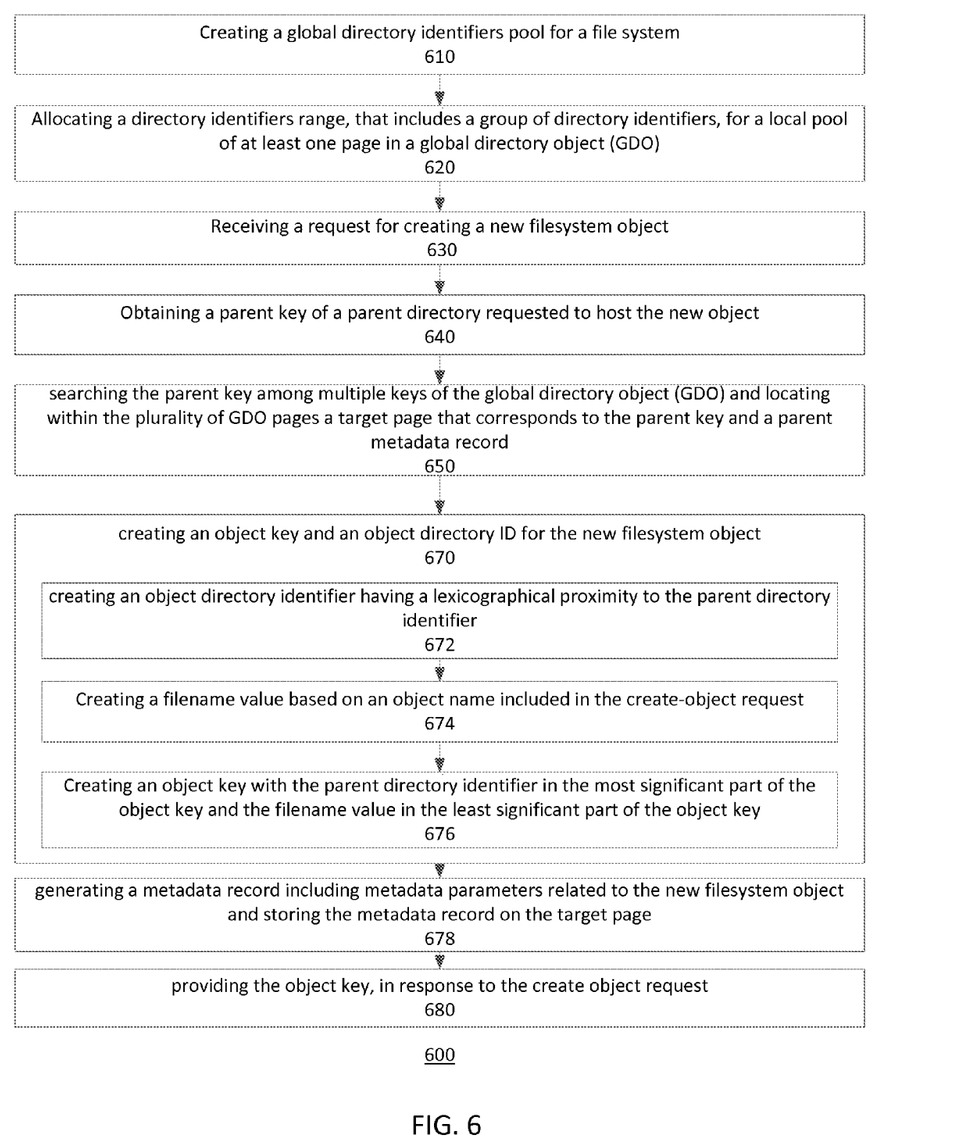
FIG. 6 is a flowchart illustrating a method for creating new objects, in accordance with an embodiment of the presently disclosed subject matter.

FIG. 6 illustrates a flowchart of a method 600 for creating new objects in the GDO. The GDO is created while adding new objects into it. The steps of method 600 can be performed by processor 121 of object management system 100.

Step 610 is an optional step that includes creating a global directory identifiers pool for a filesystem. Step 610 is executed upon an initialization of the filesystem. The creating of the global pool includes determining a next directory ID to be assigned and a size of a group of directory IDs to be assigned to pages upon demand.

Step 620 is an optional step that includes allocating a directory identifiers range, from the global directory identifiers pool, for a local pool of at least one page in a global directory object (GDO). The directory identifiers range is a group of multiple consecutive directory identifiers. Step 620 is performed whenever a new page in the GDO is created or when a local pool of a GDO page is exhausted. In case the GDO is a tree, then step 620 is performed when a root page of the tree is created. Other pages are created only upon a process of node split and in this case the new page inherits half of the local pool of the split page. Step 620 is also executed when the local pool of a split page is not large enough for splitting.

Step 630 includes receiving a request for creating a new filesystem object, wherein the request includes a parent key that identifies a parent directory that is requested for hosting the new filesystem object. The parent key may be included in a file handle. The parent key may be obtained from the request, e.g. from the file-handle that is included in the request. The new filesystem object to be created may be a file, a directory, an ACL or any other object. The parent key may identify a direct patent directory or a non-direct parent directory, such as a grandparent directory, or any other directory in the levels above the new object. If the parent key is of a non-direct parent then a directory path from the non-direct parent to the direct parent directory should be provided as part of the create-object request, in addition to the parent key (or file handle).

Step 630 is followed by a step 640 for obtaining the parent key of the parent directory, requested for hosting the new object. The parent key includes a grandparent directory ID that identifies a parent directory of the parent directory and a filename value of the parent directory.

Step 640 is followed by step 650 of searching the parent key among multiple keys of the global directory object (GDO) and locating within the plurality of GDO pages a target page that corresponds to the parent key and a parent metadata record, which is a record that includes metadata parameters related to the parent directory. The parent metadata record includes a parent directory ID, which is the directory ID of the parent directory. The parent directory ID will serve as the most significant part of an object key of the new object. Other parameters that are required for the object creation (e.g. permission) also can be found in the parent metadata record. If the parent key provided in the create object request is not of a direct parent then step 650 is performed multiple times for the non-direct parent(s), wherein each iteration includes obtaining a directory ID and a filename from a metadata record of the non-direct parent and composing a key that serves for searching in the next iteration until composing the key of the direct parent, i.e. the parent key, and the target page of the direct parent directory.

Step 650 is followed by step 670 of creating an object key and an object directory ID for the new filesystem object. The object directory ID is generally created only for directories. The object key is created so as to correspond to the target page, in terms of lexicographical order. This corresponding is achieved by creating a key that is lexicographically subsequent to the key of the parent directory, as detailed in steps 672 and 676. The creation of the object key, as a key that corresponds to the target page, enables storing the metadata record of the new object in the target page.

In a case when the new filesystem object is a sub-directory, step 670 includes step 672 of creating an object directory identifier having lexicographical proximity to the parent directory identifier. The lexicographical proximity causes the object key and the parent key to belong to the same page or to an adjacent page (in case there is no room in the target page). The creating of a directory identifier may be implemented by allocating the directory identifier from a local pool associated with the target page and including consecutive identifiers. According to another embodiment, the directory identifier includes the parent directory identifier as the most significant part, appended by a uniquifier index, e.g. an incremental index. In this embodiment, steps 610 and 620 can be omitted.

Step 670 includes step 674 of creating a filename value based on an object name included in the create-object request. The filename value is created such that multiple filename values are consecutive, if the corresponding object names are consecutive. The length of the filename value is smaller or equal to the length of the object name. Method 700 of FIG. 7 describes the creation of the filename value.

Step 670 includes step 676 of creating an object key with the parent directory identifier as the most significant part of the object key and the filename value as the least significant part of the object key.

Step 670 is followed by step 678 of generating a metadata record including metadata parameters related to the new filesystem object and storing the metadata record on the target page. Stage 675 further includes allocating a free metadata record in the target page for the new object. In case there are no free metadata records and the GDO is a B–tree, a page split takes place. Stage 675 further includes associating the metadata record with the object key. The association may be, for example, by storing the object key in the target page, in an area dedicated for keys and associating the object key with a pointer or a reference that points to the metadata record.

Step 675 is followed by step 680 of providing the object key, in response to the create object request. Step 680 may include providing a file handle that includes the object key. The object key is small enough to be fitted in a file handle, which is typically of 64 bytes and even smaller. The object key, though small enough, still is capable of representing the filename, which may be quite long, even longer than the 64 bytes of the file handle, as detailed in FIG. 7.

Figure 7:
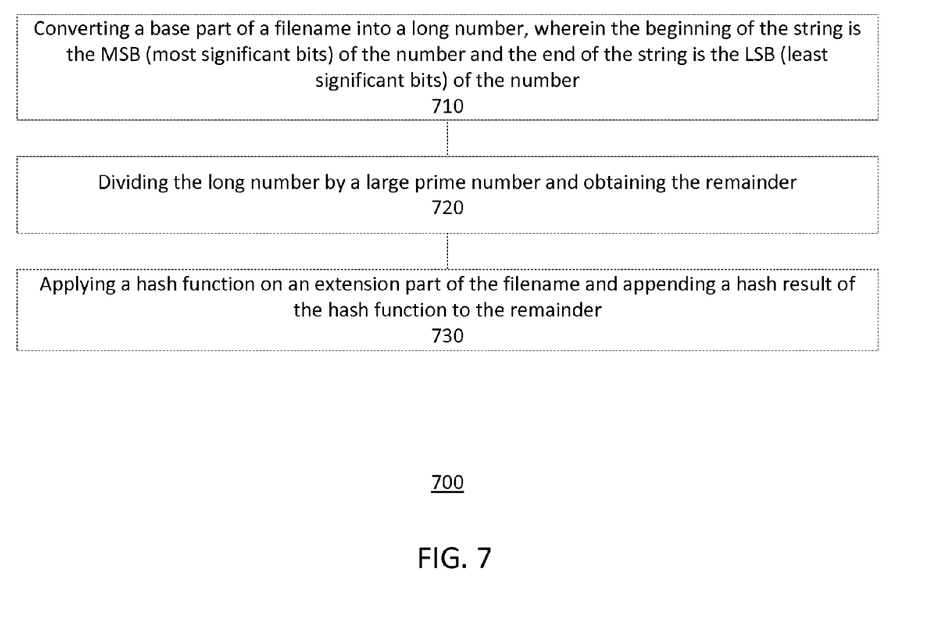
FIG. 7 is a flowchart illustrating a method for converting a filename into a filename value, in accordance with an embodiment of the presently disclosed subject matter.

FIG. 7 illustrates a method 700 for creating a filename value, based on a filename. The filename value serves as a key for searching metadata of a corresponding file. The filename value is created such that multiple filename values are consecutive, if the corresponding object names are consecutive. Method 700 can be performed by processor 121 of object management system 100.

Method 700 starts with a step 710 of converting a base part of a filename into a long number, wherein the beginning of the string is the MSB (most significant bits) of the number and the end of the string is the LSB (least significant bits) of the number.

Step 710 is followed by step 720 of dividing the long number by a large prime number and obtaining the remainder. The large prime number may be the largest prime number that can be represented by e.g. 64 bits or 32 bits. The size of the large prime number determines the length of the filename value.

Step 720 is followed by step 730 of applying a hash function on an extension part of the filename and appending a hash result of the hash function to the remainder.

Method 700 may include converting the filename to a predetermined case mode, prior to step 710. The predetermined case mode may be either a lower case or upper case and should be the same for any execution of method 700.

Figure 8:
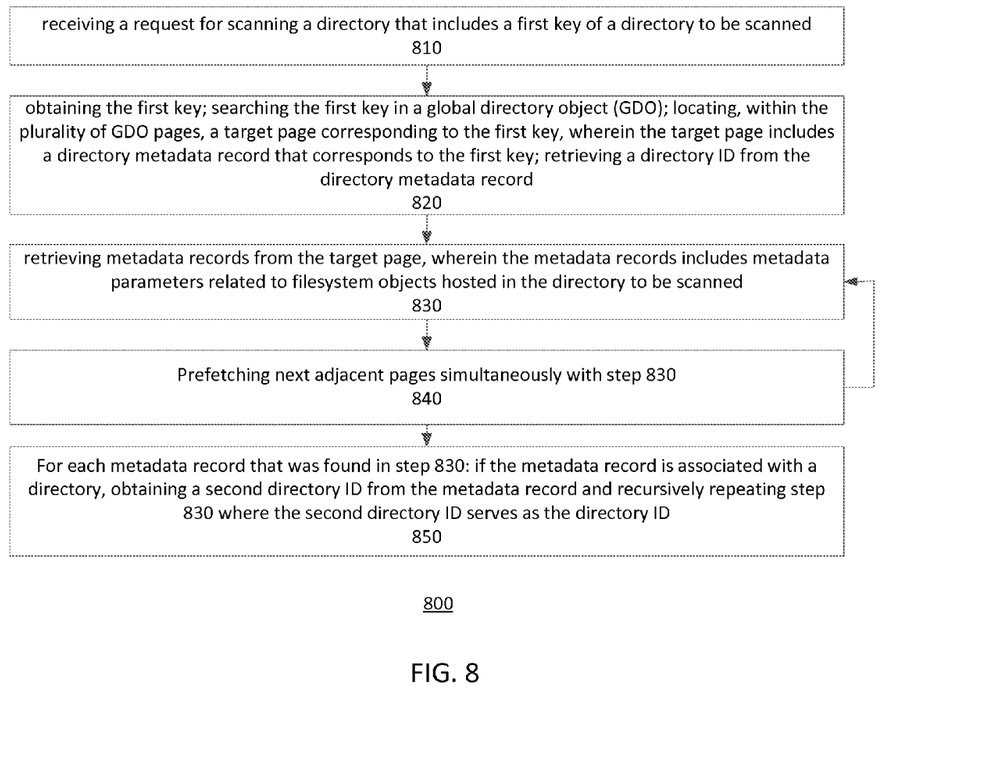
FIG. 8 is a flowchart illustrating a method for scanning directories, in accordance with an embodiment of the presently disclosed subject matter.

FIG. 8 illustrates a method 800 for scanning a directory. The scanning may be associated with one directory or may be a recursive scanning of an entire sub-tree that underlies below the directory, with the directory to be scanned serving as the root of the sub-tree. Method 800 can be performed by processor 121 of object management system 100.

Method 800 starts with step 810 of receiving a request for scanning a directory. The request includes a first key of a directory to be scanned. The first key includes a first directory identifier as the most significant part. The directory scan request may be for example an NFS-READDIR command that reads all the filenames in a directory or an NFS-READ-DIRPLUS command that reads the filenames and attributes from the directory, or similar commands of other filesystem protocols. The directory scan request may also be a directory tree traversing request that read all the filenames and/or attributes, not only from the specified directory, but also from the entire directory tree composed of underlying sub-directories.

Step 810 is followed by step 820 of obtaining the first key, searching the first key in a global directory object (GDO) that includes a plurality of GDO pages, and locating, within the plurality of GDO pages, a target page corresponding to the first key, wherein the target page includes a directory metadata record that corresponds to the first key. Step 820 further includes retrieving a directory ID from the directory metadata record.

Step 820 is followed by step 830 of retrieving metadata records from the target page, wherein the metadata records include metadata parameters related to filesystem objects hosted in the directory to be scanned. The metadata records are respectively associated with object keys that identify the filesystem objects. Each object key includes the directory ID (same ID that was retrieved from the directory metadata record, in step 820) as the most significant part of the object key. The metadata entries that are associated with the object keys belong to objects included in the directory, e.g. files and sub-directories. These objects are expected to be found in the same page of the directory to be scanned, because the objects' parent directory IDs are lexicographically consequent to the parent directory ID of the directory, which are the most significant part of the first key and object keys and the GDO pages are sorted by these keys.

Other objects of the directory may be found in adjacent pages and thus step 840 of prefetching next adjacent pages, is performed simultaneously with step 830, so as to accelerate the scanning of all the objects. The next adjacent pages are pages that include higher consecutive key values comparing to the keys in the target page. Step 840 is followed by step 830 until there are no more metadata entries that are associated with the object keys, in the next adjacent pages.

In case the directory scanning request is for traversing the whole underlying directory tree, then step 850 includes, for each metadata entry that was found in step 830: if the metadata entry is associated with a sub-directory, obtaining a second (sub-directory) ID from the metadata record and recursively repeating step 830 and 840 where the sub-directory ID serves as the directory ID of step 830. Step 840 of prefetching next adjacent pages, is applicable also for descendant directories since their keys have greater and consecutive values compared to the first key. The ability to utilize prefetching improves the performance of the directory traversing.

According to embodiments of the present invention, a file handle includes the object key, which is directory ID 211 of the object's parent and filename value 212. Additionally, the file handle may include traditional fields, such as but not limited to: a filesystem ID, an inode number and a generation number. The generation and inode number can be utilized (in addition to compatibility purposes) for further verifying the uniqueness of the file handle, in case the formula that generated the filename value may generate duplicates values. Other uniquefying fields, besides generation and inode number, may be used.

A filesystem command that does not provide a file handle of the object to be accessed, e.g. lookup command, includes a parent file handle and an object name. The parent key is taken from the parent file handle. The parent key is then used for searching the parent metadata record in the GDO and the parent directory ID is taken from the parent metadata record. The filename value is created based on the name of the object. The parent directory ID and the filename value compose the key that is used for looking-up the object in the GDO. In addition, the file handle of the object is also composed of the parent directory ID and the filename value. The file handle is then returned to the caller of the lookup command, to be used in subsequent commands. The caller may then issue a filesystem command (e.g. read, write) that provides the file handle. The parent directory ID and the filename value are obtained from the file handle and are used as a key for searching the metadata entry of the object in the GDO.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

I claim:

1. A method for managing filesystem objects of a filesystem, the method comprising:
   receiving a request for creating a new file;
   obtaining, in response to the receiving of the request for creating the new file, a direct parent object key that identifies a direct parent directory requested for hosting said new file;
   locating within a plurality of global directory object (GDO) pages of a GDO a target page by looking up the GDO with said direct parent object key, wherein said target page comprises a direct parent directory metadata record that is (i) associated with the direct parent object key and (ii) comprises metadata parameters related to the direct parent directory;
   wherein the filesystem objects are (i) selected from files and directories, (ii) located in a non-transitory storage media, (iii) arranged in a hierarchical directory structure, and (iv) associated with a plurality of metadata records;
   wherein the plurality of metadata records are included in the GDO;
   creating an object key for identifying the new file in the filesystem and for looking up the new file in the GDO, wherein said object key is created as having a value that corresponds to a lexicographical order of object keys associated with metadata records of the plurality of metadata records that are included in the target page, thereby enabling accommodation of an object metadata record on said target page, said object metadata record associated with the object key for identifying the new file and configured to comprise metadata parameters related to the new file;
   wherein the plurality of metadata records are ordered within the GDO by values of object keys identifying the filesystem objects;
   in response to receiving a request for creating a new subdirectory under the direct parent directory, creating an object directory identifier, such that the object directory identifier is lexicographically subsequent to a direct parent directory identifier of the direct parent directory,
   wherein one of the following is true:
      (i) the object directory identifier comprises the direct parent directory identifier as a most significant part, appended by an uniquifier index; and
      (ii) the object directory identifier is selected from a predefined pool of consecutive identifiers, said predefined pool being associated with the target page; and
   creating a filename value by applying a formula on an object name comprised in said request for creating the new file, wherein the object key comprises a direct parent directory identifier uniquely identifying the direct parent directory, as a most significant part of the object key and a respective filename value as a least significant part of the object key.

2. The method of claim 1, comprising generating said object metadata record file; associating said object metadata record with the object key, and storing said object metadata record on the target page.

3. The method of claim 1, wherein said request for creating the new file comprises a parent key, wherein said parent key is indicative of a non-direct parent directory, and wherein the method further comprising:
   a. locating within the plurality of GDO pages a page, by looking up the GDO with said parent key, wherein said page comprises a non-direct parent metadata record associated with the non-direct parent directory;
   b. obtaining a respective directory identifier and a filename, corresponding to the non-direct parent directory, from the non-direct parent metadata record;
   c. composing a new parent key based on the directory identifier and the filename and repeating the locating and the obtaining until composing the direct parent key.

4. The method of claim 1, wherein the object directory identifier comprises the direct parent directory identifier as the most significant part, appended by the uniquifier index.

5. The method of claim 1, wherein the object directory identifier is selected from the predefined pool of consecutive identifiers, said predefined pool being associated with the target page.

6. The method of claim 1, wherein the filename value is created such that multiple filename values are consecutive if corresponding object names are consecutive.

7. The method of claim 1 further comprising creating a file handle configured to accommodate the object key and providing the file handle in response to said request for creating the new file.

8. A system for managing filesystem objects of a filesystem, the system comprising a processor and a metadata cache memory in communication with the processor, for caching global directory object (GDO) pages of a GDO
   wherein the filesystem objects are (i) selected from files and directories, (ii) located in a non-transitory storage media, (iii) arranged in a hierarchical directory structure, and (iv) associated with a plurality of metadata records;

wherein the plurality of metadata records are included in the GDO;

wherein, in response to receiving a request for creating a new file, said processor is configured to:
  obtain a direct parent object key identifying a direct parent directory requested for hosting said new file;
  locate within the plurality of GDO pages a target page by looking up the GDO with said direct parent object key, wherein said target page comprises a direct parent directory metadata record associated with the direct parent object key and comprising metadata parameters related to the direct parent directory;
  create an object key for identifying the new file in the filesystem and for looking up the new file in the GDO, wherein said object key is created as having a value that corresponds to a lexicographical order of object keys associated with metadata records, of the plurality of metadata records, comprised in the target page, thereby enabling accommodation of an object metadata record on said target page, said object metadata record associated with the object key and configured to comprise metadata parameters related to the new file;

wherein the plurality of metadata records are ordered within the GDO by values of object keys identifying the filesystem objects;

in response to receiving a request for creating a new sub-directory under the direct parent directory, said processor is configured to create an object directory identifier, such that the object directory identifier is lexicographically subsequent to a direct parent directory identifier of the direct parent directory;

wherein one of the following is true:
(i) the object directory identifier comprises the direct parent directory identifier as a most significant part, appended by an uniquifier index; and
(iii) the object directory identifier is selected from a predefined pool of consecutive identifiers, said predefined pool being associated with the target page; and creating a filename value by applying a formula on an object name comprised in said request for creating the new file, wherein the object key comprises a direct parent directory identifier uniquely identifying the direct parent directory, as a most significant part of the object key and a respective filename value as a least significant part of the object key.

9. The system of claim 8, wherein said request for creating the new files comprises a parent key, wherein said parent key is indicative of a non-direct parent directory, and wherein said processor is further configured to:
  a. locate within the plurality of GDO pages a page, by looking up the GDO with said parent key, wherein said page comprises a non-direct parent metadata record associated with a non-direct parent directory;
  b. obtain a respective directory identifier and a filename from the non-direct parent metadata record;
  c. compose a new parent key based on the directory identifier and the filename and repeat operations a) and b) until composing the direct parent key.

10. The system of claim 8, wherein the object directory identifier comprises the direct parent directory identifier as the most significant part, appended by the uniquifier index.

11. The system of claim 8, wherein the object directory identifier is selected from the predefined pool of consecutive identifiers, said predefined pool associated with the target page.

12. The system of claim 8 wherein the filesystem objects are stored in a separate storage system operatively connected to the system.

13. The method of claim 1, wherein the value of the object key is lexicographically subsequent to a value of the direct parent object key.

14. The system of claim 8, wherein the value of the object key is lexicographically subsequent to a value of the direct parent object key.

* * * * *